United States Patent [19]

Miyakawa et al.

[11] Patent Number: 5,747,164
[45] Date of Patent: May 5, 1998

[54] CONDUCTIVE COMPOSITE PLASTIC SHEET AND CONTAINER

[75] Inventors: Takeshi Miyakawa; Mikio Shimizu; Takeshi Nabeta, all of Machida, Japan

[73] Assignee: Denki Kagaku Kogyo Kabushiki Kaisha, Tokyo, Japan

[21] Appl. No.: 579,579

[22] Filed: Dec. 26, 1995

[30] Foreign Application Priority Data

| Sep. 19, 1995 | [JP] | Japan | 7-239963 |
| Sep. 19, 1995 | [JP] | Japan | 7-239964 |
| Sep. 19, 1995 | [JP] | Japan | 7-239965 |
| Sep. 19, 1995 | [JP] | Japan | 7-239966 |

[51] Int. Cl.$^6$ .................................................. B32B 9/04
[52] U.S. Cl. ........................ 428/411.1; 428/34.1; 524/495; 524/496; 252/511
[58] Field of Search ................................ 524/495, 496; 252/511; 428/411.1

[56] References Cited

U.S. PATENT DOCUMENTS

| 4,939,027 | 7/1990 | Daimon et al. | 428/284 |
| 5,334,636 | 8/1994 | Fuji et al. | 524/449 |
| 5,415,906 | 5/1995 | Miyakawa et al. | |

FOREIGN PATENT DOCUMENTS 6-226917  8/1994  Japan.

*Primary Examiner*—E. Rollins Buffalow
*Attorney, Agent, or Firm*—Oblon, Spivak, McClelland, Maier & Neustadt, P.C.

[57] ABSTRACT

An electroconductive composite plastic sheet comprising a substrate sheet made of at least one thermoplastic resin selected from the group consisting of a polyphenylene ether type resin, a polystyrene type resin and an ABS type resin and having laminated on each side of the substrate sheet, an electroconductive resin composition comprising (A) at least one thermoplastic resin selected from the group consisting of a polyphenylene ether type resin, a polystyrene type resin and an ABS type resin, (B) carbon black, and (C) an olefin type resin or (C1) a resin obtained by hydrogenation of a styrene/diene block copolymer, said electroconductive resin composition containing from 5 to 50 parts by weight of (B) the carbon black per 100 parts by weight of (A) the thermoplastic resin, and from 1 to 30 parts by weight of (C) the olefin type resin or (C1) the resin obtained by hydrogenation of a styrene/diene block copolymer, per 100 parts by weight of the total amount of (A) the thermoplastic resin and (B) the carbon black, and the sheet having the electroconductive resin composition laminated on each side thereof having a surface resistivity of from $10^2$ to $10^{10}\Omega$.

11 Claims, No Drawings

CONDUCTIVE COMPOSITE PLASTIC SHEET AND CONTAINER

BACKGROUND OF THE INVENTION

1. Field of the Invention

The present invention relates to an electroconductive composite plastic sheet suitable for packaging semiconductors, whereby staining of e.g. IC caused by falling of e.g. carbon black due to abrasion in contact with e.g. IC, is substantially reduced, and an electroconductive plastic container obtained by forming such a sheet.

2. Discussion of Background

As packaging containers for IC or electronic parts using IC, injection-molded trays, vacuum-formed trays, magazines, embossed carrier tapes, etc. have been used. To prevent breakage of IC, etc. due to static electricity, these packaging containers have been treated by e.g. (1) a method of coating an antistatic agent on the surface of the packaging containers, (2) a method of coating an electroconductive paint, (3) a method of dispersing an antistatic agent, or (4) a method of dispersing an electroconductive filler.

Method (1) provides a sufficient antistatic effect immediately after the coating. However, during the use for an extended period of time, the antistatic agent tends to flow out due to moisture or tends to be lost by abrasion, whereby a constant performance can not be obtained. Further, the surface resistivity is at a level of from $10^9$ to $10^{12}\Omega$, which is not satisfactory for packaging IC, where a high level of an antistatic effect is required.

Method (2) has a drawback that during the preparation, coating tends to be non-uniform, and the coated paint is likely to fall off by abrasion, whereby the antistatic effect will be lost, thus leading to breakage of IC, and the lead of IC tends to be stained.

Method (3) has a demerit in that it is necessary to incorporate a large amount of an antistatic agent, whereby the physical properties of the resin will deteriorate, and the surface resistivity will be substantially affected by humidity, whereby a constant performance can hardly be obtained.

In method (4), the electroconductive filler may, for example, be fine metal powder, carbon fiber or carbon black. With fine metal powder and carbon fiber among them, adequate electroconductivity can be obtained with a small amount of incorporation, but the moldability will thereby substantially deteriorate, and it is difficult to uniformly disperse them. Further, a skin layer composed solely of the resin component is likely to form on the surface of a molded product, and it is difficult to obtain a constant surface resistivity.

Whereas, carbon black can be uniformly dispersed by properly selecting the kneading conditions, etc., whereby a constant surface resistivity can easily be obtained. For this reason, carbon black is most commonly employed. However, carbon black is required to be incorporated in a large amount, whereby the fluidity or the moldability tends to deteriorate.

As resins for dispersing carbon black therein, a polyvinyl chloride type resin, a polypropylene type resin, a polyethylene terephthalate type resin, a polystyrene type resin and an ABS type resin have been used as resins of general use, and a polyphenylene ether type resin and a polycarbonate resin have been used as heat resistant resins for use at a temperature of 100° C. or higher. Among these resins, a polystyrene type resin as a resin of general use, and a polyphenylene ether type resin as a heat resistant resin, are superior to other resins in that no substantial deterioration in the fluidity or moldability is observed even when carbon black is incorporated therein in a large amount, and they are also excellent from the viewpoint of costs. Japanese Unexamined Patent Publications No. 205145/1982 and No. 18261/1987 propose methods for improving moldability and mechanical strength of a sheet as well as mechanical strength of a packaging container obtained by forming such a sheet. However, compositions obtained by adding a large amount of carbon black to these resins, have had a drawback that carbon black is likely to fall off from the surface of their molded products by abrasion.

SUMMARY OF THE INVENTION

It is an object of the present invention to overcome such drawbacks and to provide an electroconductive composite plastic sheet, whereby staining of e.g. IC caused by falling off of e.g. carbon black due to abrasion at the time of contact with e.g. IC, is substantially reduced by incorporating an olefin type resin or a resin obtained by hydrogenation of a styrene/diene block copolymer to an electroconductive resin composition comprising carbon black and at least one thermoplastic resin selected from the group consisting of a polyphenylene ether type resin, a polystyrene type resin or an ABS type resin, in a sheet comprising a substrate sheet made of at least one thermoplastic resin selected from the group consisting of a polyphenylene ether type resin, a polystyrene type resin and an ABS type resin and having the above-mentioned electroconductive resin composition laminated on each side of the substrate sheet.

Another object is to provide an electroconductive plastic container obtained by forming such a sheet.

That is, in a first aspect, the present invention provides an electroconductive composite plastic sheet comprising a substrate sheet made of at least one thermoplastic resin selected from the group consisting of a polyphenylene ether type resin, a polystyrene type resin and an ABS type resin and having laminated on each side of the substrate sheet, an electroconductive resin composition comprising (A) at least one thermoplastic resin selected from the group consisting of a polyphenylene ether type resin, a polystyrene type resin and an ABS type resin, (B) carbon black, and (C) an olefin type resin or (C1) a resin obtained by hydrogenation of a styrene/diene block copolymer, said electroconductive resin composition containing from 5 to 50 parts by weight of (B) the carbon black per 100 parts by weight of (A) the thermoplastic resin, and from 1 to 30 parts by weight of (C) the olefin type resin or (C1) the resin obtained by hydrogenation of a styrene/diene block copolymer, per 100 parts by weight of the total amount of (A) the thermoplastic resin and (B) the carbon black, and the sheet having the electroconductive resin composition laminated on each side thereof having a surface resistivity of from $10^2$ to $10^{10}\Omega$.

In a second aspect, the present invention provides an electroconductive composite plastic sheet comprising a substrate sheet made of at least one thermoplastic resin selected from the group consisting of a polyphenylene ether type resin, a polystyrene type resin and an ABS type resin and having laminated on each side of the substrate sheet, an electroconductive resin composition comprising (A) at least one thermoplastic resin selected from the group consisting of a polyphenylene ether type resin, a polystyrene type resin and an ABS type resin, (B) carbon black, (C) an olefin type resin, and (D) at least two different block copolymers produced from styrene and a conjugated diene, said electroconductive resin composition containing from 5 to 50 parts by weight of (B) the carbon black per 100 parts by weight of (A) the thermoplastic resin, and from 1 to 30 parts by weight of (C) the olefin type resin and from 0.2 to 10 parts by weight, in total, of the at least two different block copolymers produced from styrene and a conjugated diene, per 100 parts by weight of the total amount of (A) the thermoplastic resin and (B) the carbon black, and the sheet having the electroconductive resin composition laminated on each side thereof having a surface resistivity of from $10^2$ to $10^{10}\Omega$.

In a third aspect, the present invention provides an electroconductive composite plastic sheet comprising a substrate sheet made of at least one thermoplastic resin selected from the group consisting of a polyphenylene ether type resin, a polystyrene type resin and an ABS type resin and having laminated on each side of the substrate sheet, an electroconductive resin composition comprising (A) at least one thermoplastic resin selected from the group consisting of a polyphenylene ether type resin, a polystyrene type resin and an ABS type resin, (B) carbon black, (C) an olefin type resin, and (E) a resin obtained by hydrogenation of a styrene/diene block copolymer and/or a resin obtained by graft copolymerization of styrene to a polyolefin, said electroconductive resin composition containing from 5 to 50 parts by weight of (B) the carbon black per 100 parts by weight of (A) the thermoplastic resin, and from 1 to 30 parts by weight of (C) the olefin type resin and from 1 to 30 parts by weight of (E) the resin obtained by hydrogenation of a styrene/diene block copolymer and/or the resin obtained by graft copolymerization of styrene to a polyolefin, and the sheet having the electroconductive resin composition laminated on each side thereof having a surface resistivity of from $10^2$ to $10^{10}\Omega$.

DETAILED DESCRIPTION OF THE PREFERRED EMBODIMENTS

Now, the present invention will be described in detail.

In the present invention, for each of the substrate sheet and the electroconductive resin composition layers, (A) at least one thermoplastic resin selected from the group consisting of a polyphenylene ether type resin, a polystyrene type resin and an ABS resin is used. Here, the polyphenylene ether type resin is a resin comprising a polyphenylene ether resin and a polystyrene type resin as the main components. The content of the polyphenylene ether resin in 100 parts by weight of the total amount of the polyphenylene ether resin and the polystyrene type resin, is preferably from 28 to 86 parts by weight. If the content is less than 28 parts by weight, no adequate dynamical properties as the polyphenylene ether type resin tend to be obtained, and if it exceeds 86 parts by weight, the fluidity tends to be low, whereby molding tends to be difficult. Such a polyphenylene ether resin may, for example, be a homopolymer or a copolymer disclosed in U.S. Pat. No. 3,383,435.

The polystyrene type resin to be used in the present invention is the one composed mainly of a common polystyrene resin, an impact-resistant polystyrene resin, or a mixture thereof.

The ABS type resin is the one composed mainly of a copolymer consisting essentially of three components of acrylonitrile/butadiene/styrene.

(B) carbon black to be used in the present invention may, for example, be furnace black, channel black or acetylene black and preferably the one having a large specific surface area and whereby a high level of electroconductivity can be obtained with a small amount of incorporation to the resin. For example, it may be S.C.F. (Super Conductive Furnace), E.C.F. (Electric Conductive Furnace), KETJENBLACK (tradename, manufactured by LION-AKZO) or acetylene black. The amount of carbon black to be incorporated is an amount whereby the surface resistivity in a state laminated on the substrate sheet will be from $10^2$ to $10^{10}\Omega$. The amount of (B) carbon black is preferably from 5 to 50 parts by weight per 100 parts by weight of (A) the thermoplastic resin. If the amount is less than 5 parts by weight, no adequate electroconductivity can be obtained, and the surface resistivity will increase. On the other hand, if it exceeds 50 parts by weight, uniform dispersion into the resin tends to be difficult, the moldability tends to substantially deteriorate, and the properties such as mechanical strength tend to deteriorate. Further, if the surface resistivity exceeds $10^{10}\Omega$, no adequate antistatic effect can be obtained, and if it is less than $10^2\Omega$, the power generating ability tends to be so good that IC will thereby be destroyed.

(C) the olefin type resin to be used in the present invention may, for example, be a homopolymer of ethylene or propylene, a copolymer composed mainly of ethylene or propylene, or a blend product thereof. In the present invention, among these resins, it is preferred to employ a polyethylene type resin represented by a low density polyethylene resin, a high density polyethylene resin or a linear low density polyethylene resin, or an ethylene/α-olefin copolymer resin.

Further, in a case where (D) at least two different block copolymers prepared from styrene and a conjugated diene, or (E) a resin obtained by hydrogenation of a styrene/diene block copolymer and/or a resin obtained by graft polymerization of styrene to a polyolefin, is used in combination with (C) the olefin type resin, it is particularly preferred to use a polyethylene type resin.

The ethylene/α-olefin copolymer resin to be used in the present invention is a resin prepared by copolymerizing ethylene with an α-olefin. The α-olefin copolymerized with ethylene may, for example, be propylene, butene-1, pentene-1 or hexene-1, specifically "TAFMER P" or "TAFMER A", manufactured by Mitsui Petrochemical Co., Ltd. The ethylene/α-olefin copolymer resin is preferably the one having a hardness of at most 90 as Durometer A type surface hardness stipulated in JIS K-7215.

The melt flow index of (C) the olefin type resin to be used in the present invention is at least 0.1 g/10 min as measured at 190° C. under a load of 2.16 kg (in accordance with JIS K-7210). If it is less than this numerical value, kneading with the polyphenylene ether type resin, the polystyrene type resin or the ABS type resin tends to be difficult, and it will be difficult to obtain a satisfactory composition. The amount of (C) the olefin type resin is preferably from 1 to 30 parts by weight, more preferably from 3 to 25 parts by weight, per 100 parts by weight of the total amount of (A) the thermoplastic resin and (B) the carbon black. If the amount is less than 1 part by weight, its effects tend to be inadequate, and if it exceeds 30 parts by weight, it tends to be difficult to uniformly disperse it into the polyphenylene ether type resin, the polystyrene type resin or the ABS type resin.

The conjugated diene for the styrene/conjugated diene block copolymer used for the preparation of (C1) the resin obtained by hydrogenation of a block copolymer produced from styrene and a conjugated diene to be used in the present invention, is preferably butadiene or isoprene. The styrene content in the styrene/conjugated diene block copolymer is not particularly limited, but is usually from 10 to 80 wt %, preferably from 10 to 50 wt %. The amount of (C1) the resin obtained by hydrogenation of a block copolymer produced from styrene and a conjugated diene is preferably from 1 to 30 parts by weight per 100 parts by weight of the total amount of (A) the thermoplastic resin and (B) the carbon black. If the amount is less than 1 part by weight, its effects tend to be inadequate, and if it exceeds 30 parts by weight, it tends to be difficult to uniformly disperse it in the polyphenylene ether type resin, the polystyrene type resin or the ABS type resin.

In the present invention, (D) the block copolymer prepared from styrene and a conjugated diene is the one wherein the conjugated diene is butadiene or isoprene. Specifically, it is a block copolymer of styrene and butadiene, or a block copolymer of styrene and isoprene. Specifically, such a block copolymer may, for example, be a branched star block copolymer as disclosed in U.S. Pat. No. 3,281,383 or a linear block copolymer having at least three blocks, as represented by e.g. (S1)-(Bu)-(S2) wherein each of S1 and S2 is a block formed by styrene, and Bu is a block formed by butadiene or isoprene.

Further, when at least two different block copolymers prepared from styrene and a conjugated diene are incorporated into the electroconductive resin composition in the present invention, it is preferred that at least one of them is (D1) a star block copolymer having a styrene content of from 50 to 90 wt %, and at least one of other block copolymers is (D2) a star or linear block copolymer having a styrene content of from 10 to 50 wt %. In many cases, this branched chain star block copolymer contains a straight chain block copolymer from the nature of the process for its production, but it is unnecessary to remove such a straight chain block copolymer, and their mixture may be employed as it is.

The amount of (D) the at least two different block copolymers prepared from styrene and a conjugated diene is preferably from 0.2 to 10 parts by weight, in total, per 100 parts by weight of the total amount of (A) the thermoplastic resin and (B) the carbon black. If the amount is less than 0.2 part by weight, its effects tend to be inadequate, and if it exceeds 10 parts by weight, it tends to be difficult to disperse it uniformly into the polyphenylene ether type resin, the polystyrene type resin or the ABS type resin.

In the present invention, as a resin composition tend to be inadequate, and if it exceeds 30 parts by weight, it tends to be difficult to uniformly disperse it in the polyphenylene ether type resin, the polystyrene type resin or the ABS type resin.

Further, to the thermoplastic resin for the substrate sheet and the electroconductive resin composition of the present invention, it is possible to incorporate various additives such as a lubricant, a plasticizer, a processing assistant and a reinforcing agent (a resin modifier), and other resin components, to improve the flow properties of the composition and the dynamic properties of the molded product.

In order for the electroconductive resin composition of the present invention to maintain the adequate moldability, when carbon black is incorporated so that the surface resistivity of the sheet laminated with the electroconductive composition would be from $10^2$ to $10^{10}\Omega$, the melt flow index (as measured in accordance with JIS K-7210) is preferably at least 0.1 g/10 min, as measured at 230° C. under a load of 10 kg in the case of the polyphenylene ether type resin, at 200° C. under a load of 5 kg in the case of the polystyrene type resin, and at 220° C. under a load of 10 kg in the case of the ABS type resin.

To prepare the electroconductive composite plastic sheet of the present invention, firstly a part or whole of the starting materials for the above electroconductive comprising (C) the olefin type resin and (D) the at least two different block copolymers prepared from styrene and a conjugated diene, it is possible to employ an alloy resin having the block copolymer previously kneaded together with a styrene type resin and the olefin type resin. As a typical example, the resin composition disclosed in Japanese Unexamined Patent Publication No. 311009/1993 may be employed.

Component (E) to be used in the present invention is a resin obtained by hydrogenation of a styrene/diene block copolymer and/or a resin obtained by graft polymerization of styrene to a polyolefin. The resin obtained by hydrogenation of the styrene/diene block copolymer may be the same as the above-mentioned (C1) resin obtained by hydrogenation of a block copolymer prepared from styrene and a conjugated diene. On the other hand, the polyolefin used for the resin obtained by graft polymerization of styrene to a polyolefin, is preferably polyethylene, polypropylene or an ethylene/vinyl acetate copolymer.

The amount of (E) a resin obtained by hydrogenation of a styrene/diene block copolymer and/or a resin obtained by graft polymerization of styrene to a polyolefin, is preferably from 1 to 30 parts by weight, in total, per 100 parts by weight of the total amount of (A) the thermoplastic resin and (B) the carbon black. If the amount is less than 1 part by weight, its effects resin composition is kneaded and pelletized by means of conventional methods employing a Banbury mixer, an extruder, etc., and the obtained electroconductive resin composition is sheeted together with a thermoplastic resin constituting the substrate sheet by a conventional method employing e.g. an extruder.

With respect to kneading of the electroconductive resin composition, starting materials may be kneaded all at once or may be stepwisely kneaded in such a manner that, for example, the styrene type resin and the carbon black, and the styrene type resin and the olefin type resin are separately kneaded, and the kneaded products are finally put together and kneaded. Further, it is also possible that separately kneaded and obtained pellets are kneaded together when sheeted by an extruder, or starting materials other than the olefin type resin are preliminarily kneaded, and the olefin type resin is added thereto at the time of sheeting by an extruder.

As a method for laminating the electroconductive resin composition on the substrate sheet, the respective layers may be firstly formed into sheets or films by an extruder and then stepwisely laminated by a thermolaminating method, a dry laminating method or an extrusion laminating method. Otherwise, a laminated sheet can be obtained all at once by e.g. a multilayer coextrusion method employing a feed block or a multimanifold die.

The entire thickness of the sheet of the present invention is from 0.1 to 3.0 mm, and the electroconductive resin composition layer is laminated on each side of the substrate sheet. The proportion of the thickness of the conductive resin composition in the entire thickness is at least 2% on each side, and at most 80% in total of both sides. If the entire thickness is less than 0.1 mm, the strength of the packaging container obtained by forming the sheet, tends to be inadequate, and if it exceeds 3.0 mm, forming by pressure forming, vacuum forming or thermoforming tends to be difficult. If the electroconductive resin composition layer is present only on one side of the sheet, or if the proportion of the thickness of the electroconductive resin composition layers in the entire thickness is less than 2% on one side, the surface resistivity of the packaging container obtained by forming such a sheet tends to be so high that no adequate antistatic effects can be obtained, and if the proportion of the thickness in total of both sides exceeds 80%, the properties such as the mechanical strength of the composite plastic sheet tend to be poor.

The electroconductive composite plastic sheet of the present invention is suitable for packaging semiconductors. The electroconductive composite plastic container obtained by forming the sheet by a conventional sheet-forming method such as pressure forming, vacuum forming or thermoforming, is useful as a container for packaging semiconductors. Specifically, such a plastic container may, for example, be a vacuum-formed tray, magazine or embossed carrier tape for packaging IC, or a vacuum-formed tray for packaging an electronic part or electronic equipment employing IC.

Now, the present invention will be described in further detail with reference to Examples. However, it should be understood that the present invention is by no means restricted by such specific Examples.

EXAMPLES 1 to 25

Using the materials as identified in Tables 1 and 2, the respective materials were weighed in the compositional ratios as identified in Tables 3 to 5, uniformly mixed by a high speed mixing machine, then kneaded by means of a φ45 mm vented twin-screw extruder and pelletized by a strand cut method to obtain an electroconductive resin composition. Each electroconductive resin composition was laminated on each side of a substrate sheet substantially in the same thickness by a feed block method using a φ65 mm extruder (L/D=28) or a φ40 mm extruder (L/D=26) and a T-die having a width of 500 mm to obtain a sheet having an entire thickness of 300 μm. The combination of the substrate sheet and the electroconductive resin composition layers, and the ratio of the substrate sheet in the entire thickness are shown in Tables 3 to 5.

Further, the obtained composite sheet was vacuum formed to obtain a vacuum-formed tray and an embossed carrier tape for packaging IC of QFP 14 mm×20 mm/64 pin.

The evaluation results are shown in Tables 7 to 10. In each Examples, the results were excellent without falling of carbon black.

COMPARATIVE EXAMPLES 1 to 6

In the same manner as in Examples, using the materials as identified in Tables 1 and 2, the respective materials were weighed in the compositional ratios as identified in Table 6, uniformly mixed by a high speed mixing machine, then kneaded by means of a φ45 mm vented twin-screw extruder and pelletized by a strand cut method to obtain an electroconductive resin composition. In the same manner as in Examples, a sheet having an entire thickness of 300 μm was prepared. The combination of the substrate sheet and the electroconductive resin composition layers, and the ratio of the substrate sheet in the entire thickness are shown in Table 6.

Further, the obtained sheet was vacuum formed to obtain the same vacuum-formed tray and the embossed carrier tape for packaging IC as in the Examples. The evaluation results are shown in Table 11.

The respective evaluations were carried out by the following methods.

(1) Surface resistivity

Using a Rolestar surface resistivity meter (manufactured by Mitsubishi Petrochemical Co., Ltd.), the electrode distance was set to be 10 mm, and with respect to the sheet sample, the resistivity was measured at optional ten points on the surface thereof, and with respect to the vacuum-formed tray and the embossed carrier tape, the resistivity was measured at 10 points at the center of the inner bottom surface of the pocket portion thereof, whereupon the respective logarithmic mean values were taken as the surface resistivity.

(2) Strength at break and tensile modulus

In accordance with JIS K-7113, with respect to the sheet sample, a No. 2 test specimen was measured at a tensile speed of 10 mm/min.

(3) Presence or absence of falling of carbon black

With respect to the sheet sample, IC of QFP 14 mm×20 mm/64 pin was pressed against the surface under a load of 100 g, and it was reciprocated 100 times at a stroke of 15 mm, whereupon the lead portion of IC was inspected by a microscope.

With respect to the vacuum-formed tray and the embossed carrier tape, the same IC was mounted in the pocket portion and vibrated at a speed of 400 reciprocations per minute with a stroke of 30 mm in a plane direction for 200,000 times, whereupon the lead portion of IC was inspected by a microscope. The evaluation was made based on whether or not black deposition of carbon black or the like on the lead portion was observed.

(4) MFI

With respect to the electroconductive resin compositions of the respective Examples and Comparative Examples, MFI was measured in accordance with JIS 7210.

TABLE 1

Materials

| Grade | Name | Manufacturers |
|---|---|---|
| NORYL-731J | Polyphenylene ether type resin | GE plastic |
| HI-E4 | Impact-resistant polystyrene resin | Denki Kagaku Kogyo K.K. |
| HRM-5 | Transparent polystyrene resin | Denki Kagaku Kogyo K.K. |
| SE-10 | ABS resin | Denki Kagaku Kogyo K.K. |
| Granular DENKA BLACK | Carbon black | Denki Kagaku Kogyo K.K. |
| KETJENBLACK | Carbon black | LION-AKZO |
| VULCAN-XC-72 | Carbon black | Cabolac |
| TUFTEC-H-1051 | Hydrogenated styrene/diene block copolymer | Asahi Kasei K.K. |
| TUFTEC-H-1052 | Hydrogenated styrene/diene block copolymer | Asahi Kasei K.K. |
| VMX-AN-50F | Ethylene/styrene graft copolymer resin | Mitsubishi Chemical Corporation |

TABLE 1-continued

Materials

| Grade | Name | Manufacturers |
|---|---|---|
| MIRASON 102 | Low density polyethylene resin | Mitsui Petrochemical Co. |
| MIRASON 12 | Low density polyethylene resin | Mitsui Petrochemical Co. |
| ULTZEX 3520L | Linear low density polyethylene resin | Mitsui Petrochemical Co. |
| ULTZEX 1520L | Linear low density polyethylene resin | Mitsui Petrochemical Co. |
| HI-ZEX 5000S | High density polyethylene resin | Mitsui Petrochemical Co. |

TABLE 2

Materials

| Grade | Name | Manufacturers |
|---|---|---|
| ULTZEX 2022L | Linear low density polyethylene resin | Mitsui Petrochemical Co. |
| NUC-6169 | Ethylene-ethyl acrylate copolymer resin | Nippon Unicar |
| STR-1602 | Linear styrene/butadiene block copolymer resin | Denki Kagaku Kogyo K.K. |
| STYROLUX-684D | Star styrene/butadiene block copolymer resin | BASF |
| K-RESIN KR03 | Star styrene/butadiene block copolymer resin | Philips |
| STYROBLEND KR-2776 | Star syrene/butadiene block copolymer · polystyrene resin containing olefin type resin | BASF |
| TAFMER P-0280 | Ethylene/α-olefin copolymer resin | Mitsui Petrochemical Co. |
| TAFMER A-4085 | Ethylene/α-olefin copolymer resin | Mitsui Petrochemical Co. |
| TUFTEC-H-1041 | Hydrogenated styrene/diene block copolymer | Asahi Kasei K.K. |
| TUFTEC-H-1081 | Hydrogenated styrene/diene block copolymer | Asahi Kasei K.K. |

TABLE 3

| | Materials Grade | Examples 1 | 2 | 3 | 4 | 5 | 6 | 7 | 8 | 9 | 10 | 11 |
|---|---|---|---|---|---|---|---|---|---|---|---|---|
| Compositional ratio of electroconductive layers | NORYL-731J | 100 | 100 | | | | | | 100 | | | |
| | HI-E4 | | | 70 | 100 | | | | | 100 | 70 | |
| | HRM-5 | | | 30 | | 100 | | | | | 30 | |
| | SE-10 | | | | | | 100 | 100 | | | | 100 |
| | Granular DENKA BLACK | 26 | | | | 26 | | | 26 | | | 30 |
| | KETJENBLACK | | 12 | | | | 12 | 12 | | 12 | | |
| | VULCAN-XC-72 | | | 24 | 24 | | | | | | 24 | |
| | TUFTEC-H-1052 | | | | | 10 | | | | | | |
| | VMX-AN-50F | | 5 | | | | | | | | | |
| | MIRASON 102 | 20 | | | | | 15 | | | | | |
| | MIRASON 12 | | | 10 | | | | | | | | |
| | ULTZEX 3520L | | | | | | | 15 | | | | |
| | ULTZEX 1520L | | | | 10 | | | | | | | |
| | HI-ZEX 5000S | | 20 | | | 10 | | | | | | |
| | NUC-6169 | | | | | | | | 4 | | | |
| | ULTZEX 2022L | | | | | | | | | 3 | | |
| | TAFMER P-0280 | | | | | | | | 20 | 20 | | |
| | TAFMER A-4085 | | | | | | | | | | 30 | 10 |
| Resin and thickness ratio (%) of substrate layer | NORYL-731J | 40 | | | 80 | | | | 40 | | | 80 |
| | HI-E4 | | 60 | | | 80 | | 80 | | 60 | | |
| | SE-10 | | | 70 | | | 80 | | | | 70 | |

TABLE 4

| | Materials | Examples | | | | | | |
| --- | --- | --- | --- | --- | --- | --- | --- | --- |
| | Grade | 12 | 13 | 14 | 15 | 16 | 17 | 18 |
| Compositional ratio of electroconductive layers | NORYL-731J | 100 | | | | | | |
| | HI-E4 | | 100 | 100 | 70 | 70 | | |
| | HRM-5 | | | | 30 | 30 | | |
| | SE-10 | | | | | | 100 | 100 |
| | NUC-6169 | 4 | | 8 | | | | |
| | ULTZEX 1520L | 6 | 15 | | 6 | | | |
| | ULTZEX 2022L | | | | | | | 20 |
| | HI-ZEX 5000S | | | 6 | | | 15 | |
| | Granular DENKA BLACK | 26 | 26 | | | | | 30 |
| | KETJENBLACK | | | 12 | 12 | | | |
| | VULCAN-XC-72 | | | | | 24 | 24 | |
| | STR-1602 | 1 | 2 | 0.4 | | | 3 | |
| | STYROLUX-684D | 2 | | 0.4 | | | | 4 |
| | K-RESIN KR03 | | 1 | | 2 | | 3 | |
| | STYROBLEND KR-2776 | | | | | 40 | | |
| | TUFTEC-H-1052 | | | | 5 | | | 4 |
| Resin and thickness ratio (%) of substrate layer | NORYL-731J | 40 | | | 80 | | | |
| | HI-E4 | | 60 | | | 80 | | 90 |
| | SE-10 | | | 70 | | | 80 | |

TABLE 5

| | Materials | Examples | | | | | | |
| --- | --- | --- | --- | --- | --- | --- | --- | --- |
| | Grade | 19 | 20 | 21 | 22 | 23 | 24 | 25 |
| Compositional ratio of electroconductive layers | NORYL-731J | 100 | | | | | | |
| | HI-E4 | | 100 | 100 | 70 | 70 | | |
| | HRM-5 | | | | 30 | 30 | | |
| | SE-10 | | | | | | 100 | 100 |
| | NUC-6169 | 4 | | | 5 | | | 7 |
| | ULTZEX 2022L | | | 3 | | | | |
| | Granular DENKA BLACK | 26 | 26 | | | | | |
| | KETJENBLACK | | | 12 | 12 | | | |
| | VULCAN-XC-72 | | | | | 24 | | 24 |
| | TUFTEC-H-1052 | 15 | 4 | | | | | 10 |
| | TUFTEC-H-1041 | | | | | | 10 | 10 |
| | TUFTEC-H-1051 | | | 15 | | | | |
| | TUFTEC-H-1081 | | | | 15 | | | |
| Resin and thickness ratio (%) of substrate layer | NORYL-731J | 40 | | | 80 | | | |
| | HI-E4 | | 60 | | | 80 | | 90 |
| | SE-10 | | | 70 | | | 80 | |

TABLE 6

| | Materials | Comparative Examples | | | | | |
| --- | --- | --- | --- | --- | --- | --- | --- |
| | Grade | 1 | 2 | 3 | 4 | 5 | 6 |
| Compositional ratio of electroconductive layers | NORYL-731J | 100 | | | | | |
| | HI-E4 | | 100 | 70 | 70 | | 70 |
| | HRM-5 | | | 30 | 30 | | 30 |
| | SE-10 | | | | | 100 | |
| | Granular DENKA BLACK | 26 | | | | | |
| | KETJENBLACK | | 12 | | | 12 | |
| | VULCAN-XC-72 | | | 24 | 22 | | 24 |
| | MIRASON 102 | | | | 45 | | |
| | ULTZEX 2022L | | | | 3 | | |
| | TAFMER P-0280 | | | | 45 | | |
| | STR-1602 | | | | | 0.4 | |
| | STYROLUX-684D | | | | | 0.4 | |
| Resin and thickness ratio (%) of substrate layer | NORYL-731J | 40 | | | 70 | | |
| | HI-E4 | | 60 | | | | |
| | SE-10 | | | 70 | | 70 | 80 |

TABLE 7

| | | Composition MFI (g/10 min) | Sheet sample | | | |
|---|---|---|---|---|---|---|
| | | | Surface resistivity (Ω) | Strength at break (kgf/mm²) | Tensile modulus (kgf/mm²) | Falling off of carbon |
| Examples | 1 | 2.5 | $1.4 \times 10^5$ | 5.8 | 169 | Nil |
| | 2 | 2.8 | $2.5 \times 10^4$ | 3.5 | 133 | Nil |
| | 3 | 3.1 | $5.1 \times 10^4$ | 4.3 | 142 | Nil |
| | 4 | 3.2 | $8.0 \times 10^5$ | 5.1 | 161 | Nil |
| | 5 | 4.1 | $2.4 \times 10^4$ | 3.7 | 131 | Nil |
| | 6 | 3.1 | $5.0 \times 10^4$ | 3.9 | 139 | Nil |
| | 7 | 2.8 | $7.6 \times 10^5$ | 3.6 | 135 | Nil |
| | 8 | 3.0 | $1.2 \times 10^5$ | 5.7 | 169 | Nil |
| | 9 | 3.3 | $2.5 \times 10^4$ | 3.2 | 134 | Nil |
| | 10 | 3.1 | $3.5 \times 10^4$ | 4.1 | 141 | Nil |
| | 11 | 2.8 | $5.9 \times 10^5$ | 5.3 | 158 | Nil |

TABLE 8

| | | Composition MFI (g/10 min) | Sheet sample | | | |
|---|---|---|---|---|---|---|
| | | | Surface resistivity (Ω) | Strength at break (kgf/mm²) | Tensile modulus (kgf/mm²) | Falling off of carbon |
| Examples | 12 | 2.9 | $1.5 \times 10^5$ | 5.8 | 170 | Nil |
| | 13 | 3.4 | $2.1 \times 10^4$ | 3.3 | 135 | Nil |
| | 14 | 3.1 | $4.7 \times 10^4$ | 4.3 | 141 | Nil |
| | 15 | 2.9 | $6.8 \times 10^5$ | 5.2 | 160 | Nil |
| | 16 | 3.0 | $1.7 \times 10^4$ | 3.5 | 132 | Nil |
| | 17 | 2.4 | $1.9 \times 10^4$ | 4.0 | 139 | Nil |
| | 18 | 2.3 | $5.8 \times 10^5$ | 3.7 | 136 | Nil |
| | 19 | 3.0 | $1.3 \times 10^4$ | 5.8 | 167 | Nil |
| | 20 | 3.3 | $3.1 \times 10^4$ | 3.3 | 131 | Nil |
| | 21 | 3.1 | $4.2 \times 10^4$ | 4.0 | 140 | Nil |
| | 22 | 2.8 | $5.0 \times 10^5$ | 5.3 | 163 | Nil |
| | 23 | 2.7 | $4.3 \times 10^4$ | 3.5 | 131 | Nil |
| | 24 | 2.2 | $3.5 \times 10^4$ | 3.8 | 134 | Nil |
| | 25 | 2.5 | $6.4 \times 10^5$ | 3.5 | 132 | Nil |

TABLE 9

| | | Vacuum-formed tray | | Embossed carrier tape | |
|---|---|---|---|---|---|
| | | Surface resistivity (Ω) | Falling off of carbon | Surface resistivity (Ω) | Falling off of carbon |
| Examples | 1 | $5.0 \times 10^5$ | Nil | $5.7 \times 10^5$ | Nil |
| | 2 | $6.5 \times 10^4$ | Nil | $7.0 \times 10^4$ | Nil |
| | 3 | $8.7 \times 10^4$ | Nil | $8.6 \times 10^4$ | Nil |
| | 4 | $8.8 \times 10^5$ | Nil | $1.1 \times 10^6$ | Nil |
| | 5 | $6.0 \times 10^4$ | Nil | $5.5 \times 10^4$ | Nil |
| | 6 | $6.2 \times 10^4$ | Nil | $6.5 \times 10^4$ | Nil |
| | 7 | $8.0 \times 10^4$ | Nil | $8.1 \times 10^5$ | Nil |
| | 8 | $4.8 \times 10^5$ | Nil | $5.8 \times 10^5$ | Nil |
| | 9 | $6.9 \times 10^4$ | Nil | $7.0 \times 10^4$ | Nil |
| | 10 | $8.8 \times 10^4$ | Nil | $9.5 \times 10^4$ | Nil |
| | 11 | $9.0 \times 10^5$ | Nil | $1.7 \times 10^6$ | Nil |

TABLE 10

| | | Vacuum-formed tray | | Embossed carrier tape | |
|---|---|---|---|---|---|
| | | Surface resistivity (Ω) | Falling off of carbon | Surface resistivity (Ω) | Falling off of carbon |
| Examples | 12 | $5.2 \times 10^5$ | Nil | $5.7 \times 10^5$ | Nil |
| | 13 | $7.3 \times 10^4$ | Nil | $7.9 \times 10^4$ | Nil |
| | 14 | $9.1 \times 10^4$ | Nil | $9.2 \times 10^4$ | Nil |
| | 15 | $9.9 \times 10^5$ | Nil | $1.3 \times 10^6$ | Nil |
| | 16 | $4.3 \times 10^4$ | Nil | $5.1 \times 10^4$ | Nil |
| | 17 | $6.8 \times 10^4$ | Nil | $6.5 \times 10^4$ | Nil |
| | 18 | $7.8 \times 10^5$ | Nil | $8.0 \times 10^5$ | Nil |
| | 19 | $4.9 \times 10^5$ | Nil | $5.1 \times 10^5$ | Nil |
| | 20 | $6.7 \times 10^4$ | Nil | $7.0 \times 10^4$ | Nil |
| | 21 | $8.1 \times 10^4$ | Nil | $8.2 \times 10^4$ | Nil |
| | 22 | $8.0 \times 10^5$ | Nil | $1.0 \times 10^6$ | Nil |
| | 23 | $7.1 \times 10^4$ | Nil | $7.3 \times 10^4$ | Nil |
| | 24 | $6.6 \times 10^4$ | Nil | $6.5 \times 10^4$ | Nil |
| | 25 | $9.0 \times 10^5$ | Nil | $9.2 \times 10^5$ | Nil |

TABLE 11

| | | Composition MFI (g/10 min) | Sheet sample | | | |
|---|---|---|---|---|---|---|
| | | | Surface resistivity (Ω) | Strength at break (kgf/mm²) | Tensile modulus (kgf/mm²) | Falling off of carbon |
| Comparative Examples | 1 | 1.9 | $7.1 \times 10^4$ | 5.8 | 175 | Observed |
| | 2 | 2.2 | $1.9 \times 10^4$ | 3.0 | 134 | Observed |
| | 3 | 5.1 | $7.9 \times 10^4$ | 4.0 | 142 | Observed |
| | 4 | 4.0 | $2.2 \times 10^4$ | 3.2 | 135 | Observed |
| | 5 | 2.9 | $3.2 \times 10^4$ | 4.1 | 142 | Observed |
| | 6 | 2.6 | $2.7 \times 10^4$ | 3.4 | 135 | Observed |

| | | Vacuum-formed tray | | Embossed carrier tape | |
|---|---|---|---|---|---|
| | | Surface resistivity (Ω) | Falling off of carbon | Surface resistivity (Ω) | Falling off of carbon |
| Comparative Examples | 1 | $9.1 \times 10^4$ | Observed | $9.6 \times 10^4$ | Observed |
| | 2 | $3.5 \times 10^4$ | Observed | $4.4 \times 10^4$ | Observed |
| | 3 | $9.0 \times 10^4$ | Observed | $8.8 \times 10^4$ | Observed |
| | 4 | $5.1 \times 10^4$ | Observed | $4.9 \times 10^4$ | Observed |
| | 5 | $4.0 \times 10^4$ | Observed | $4.9 \times 10^4$ | Observed |
| | 6 | $6.5 \times 10^4$ | Observed | $7.1 \times 10^4$ | Observed |

As described in the foregoing, by incorporating an olefin type resin to an electroconductive resin composition comprising carbon black and at least one thermoplastic resin selected from the group consisting of a polyphenylene ether type resin, a polystyrene type resin and an ABS type resin, in a sheet comprising a substrate sheet made of at least one thermoplastic resin selected from the group consisting of a polyphenylene ether type resin, a polystyrene type resin and an ABS resin and having laminated on each side of the substrate sheet, the above conductive resin composition, it is possible to obtain an electroconductive composite plastic sheet whereby staining of e.g. IC caused by falling off of carbon black due to abrasion at the time of contact with e.g. IC, is remarkably reduced, and an electroconductive plastic container formed from such a sheet.

What is claimed is:

1. An electroconductive composite plastic sheet comprising a substrate sheet made of at least one thermoplastic resin selected from the group consisting of a polyphenylene ether resin combined with a polystyrene resin selected from the group consisting of a common polystyrene resin, an impact-resistant polystyrene resin, and mixtures thereof: a polystyrene resin selected from the group consisting of a common polystyrene resin, an impact-resistant polystyrene resin, and mixtures thereof; and an acrylonitrile/butadiene/styrene resin, and having laminated on each side of the substrate sheet, an electroconductive resin composition consisting essentially of (A) at least one thermoplastic resin selected from the group consisting of a polyphenylene ether resin combined with a polystyrene resin selected from the group consisting of a common polystyrene resin, an impact-resistant polystyrene resin, and mixtures thereof; a polystrene resin selected from the group consisting of a common polystyrene resin, an impact-resistant polystyrene resin, and mixtures thereof; and an acrylonitrile/butadiene/styrene resin, (B) carbon black, and (C) an olefin resin selected from the group consisting of polyethylene, polypropylene, and copolymers of ethylene and α-olefin, and mixtures thereof, and wherein the melt flow index of said olefin resin is at least 0.1 g/10 min as measured at 190° C. under a load of 2.16 kg in accordance with JIS K-7210 or (C1) a resin obtained by hydrogenation of a styrene/diene block copolymer, said electroconductive resin composition containing from 5 to 50 parts by weight of (B) the carbon black per 1000 parts by weight of (A) the thermoplastic resin, and from 1 to 30 parts by weight of (C) the olefin resin or (C1) the resin obtained by hydrogenation of a styrene/diene block copolymer, per 100 parts by weight of the total amount of (A) the thermoplastic resin and (B) the carbon black, and the sheet having the electroconductive resin composition laminated on each side thereof having a surface resistivity of from $10^2$ to $10^{10}\Omega$.

2. The electroconductive composite plastic sheet according to claim 1, wherein (C) the olefin resin is a polyethylene resin.

3. The electroconductive composite plastic sheet according to claim 1, wherein (C) the olefin resin is an ethylene/α-olefin copolymer resin.

4. An electroconductive plastic container obtained by forming the electroconductive composite plastic sheet as defined in claim 1 by a process selected from the group consisting of pressure forming, vacuum forming and thermoforming.

5. An electroconductive composite plastic sheet comprising a substrate sheet made of at least one thermoplastic resin selected from the group consisting of a polyphenylene ether resin combined with a polystyrene resin selected from the group consisting of a common polystyrene resin, an impact-resistant polystyrene resin, and mixtures thereof; a polystyrene resin selected from the group consisting of a common polystyrene resin, an impact-resistant polystyrene resin, and mixtures thereof; and an acrylonitrile/butadiene/styrene resin, and having laminated on each side of the substrate sheet, an electroconductive resin composition consisting essentially of (A) at least one thermoplastic resin selected from the group consisting of a polyphenylene ether resin combined with a polystyrene resin selected from the group consisting of a common polystyrene resin, an impact-resistant polystyrene resin, and mixtures thereof; a polystyrene resin selected from the group consisting of a common polystyrene resin, an impact-resistant polystyrene resin, and mixtures thereof; and an acrylonitrile/butadiene/styrene resin, (B) carbon black, (C) an olefin resin selected from the group consisting of polyethylene, polypropylene, and copolymers of ethylene and α-olefin, and mixtures thereof, and wherein the melt flow index of said olefin resin is at least 0.1 g/10 min as measured at 190° C. under a load of 2.16 kg in accordance with JIS K-7210 and (D) at least two different block copolymers produced from styrene and a conjugated diene, said electroconductive resin composition containing from 5 to 50 parts by weight of (B) the carbon black per 100 parts by weight of (A) the thermoplastic resin, and from 1 to 30 parts by weight of (C) the olefin resin and from 0.2 to 10 parts by weight, in total, of the at least two different block copolymers produced from styrene and a conjugated diene, per 100 parts by weight of the total amount of (A) the thermoplastic resin and (B) the carbon black, and the sheet having the electroconductive resin composition laminated on each side thereof having a surface resistivity of from $10^2$ to $10^{10}\Omega$.

6. The electroconductive composite plastic sheet according to claim 5, wherein (C) the olefin resin is a polyethylene resin.

7. An electroconductive plastic container obtained by forming the electroconductive composite plastic sheet as defined in claim 5 by a process selected from the group consisting of pressure forming, vacuum forming and thermoforming.

8. The electroconductive composite plastic sheet according to claim 5, wherein among (D) the at least two different block copolymers produced from styrene and a conjugated diene, at least one is (D1) a star block polymer having a styrene content of from 50 to 90 wt %, and at least another one is (D2) a star or linear block polymer having a styrene content of from 10 to 50 wt %.

9. An electroconductive composite plastic sheet comprising a substrate sheet made of at least one thermoplastic resin selected from the group consisting of a polyphenylene ether resin combined with a polystyrene resin selected from the group consisting of a common polystyrene resin, an impact-resistant polystyrene resin, and mixtures thereof; a polystyrene resin selected from the group consisting of a common polystyrene resin, an impact-resistant polystyrene resin, and mixtures thereof; and an acrylonitrile/butadiene/styrene resin, and having laminated on each side of the substrate sheet, an electroconductive resin composition consisting essentially of (A) at least one thermoplastic resin selected from the group consisting of a polyphenylene ether resin combined with a polystyrene resin selected from the group consisting of a common polystyrene resin, an impact-resistant polystyrene resin, and mixtures thereof; a polystyrene resin selected from the group consisting of a common polystyrene resin, an impact-resistant polystyrene resin, and mixtures thereof; and an acrylonitrile/butadiene/styrene resin, (B) carbon black, (C) an olefin resin selected from the group consisting of polyethylene, polypropylene, and copolymers of ethylene and α-olefin, and mixtures thereof, and wherein the melt flow index of said olefin resin is at least 0.1 g/10 min as measured at 190° C. under a load of 2.16 kg in accordance with JIS K-7210 and (E) a resin obtained by hydrogenation of a styrene/ diene block copolymer and/or a resin obtained by graft copolymerization of styrene to a polyolefin, said electroconductive resin composition containing from 5 to 50 parts by weight of (B) the carbon black per 100 parts by weight of (A) the thermoplastic resin, and from 1 to 30 parts by weight of (C) the olefin resin and from 1 to 30 parts by weight of (E) the resin obtained by hydrogenation of a styrene/diene block copolymer and/or the resin obtained by graft copolymerization of styrene to a polyolefin, and the sheet having the electroconductive resin composition laminated on each side thereof having a surface resistivity of from $10^2$ to $10^{10} \Omega$.

10. The electroconductive composite plastic sheet according to claim 9, wherein (C) the olefin resin is a polyethylene resin.

11. An electroconductive plastic container obtained by forming the electroconductive composite plastic sheet as defined in claim 9 by a process selected from the group consisting of pressure forming, vacuum forming and thermoforming.

* * * * *